(12) United States Patent
Combs

(10) Patent No.: US 6,592,180 B2
(45) Date of Patent: Jul. 15, 2003

(54) CUP HOLDER FOR CHILD'S CAR SEAT AND ASSOCIATED METHOD

(76) Inventor: Mark Ellis Combs, 4521 Lenmore St., Orlando, FL (US) 32812

( * ) Notice: Subject to any disclaimer, the term of this patent is extended or adjusted under 35 U.S.C. 154(b) by 166 days.

(21) Appl. No.: 09/768,116

(22) Filed: Jan. 23, 2001

(65) Prior Publication Data

US 2002/0096916 A1 Jul. 25, 2002

(51) Int. Cl.[7] .............................. A47C 7/62; A47D 1/10
(52) U.S. Cl. ............................. 297/188.14; 297/188.18; 297/250.1; 248/311.2
(58) Field of Search ....................... 297/188.14, 188.18, 297/250.1, 188.2; 248/311.2

(56) References Cited

U.S. PATENT DOCUMENTS

| | | | | |
|---|---|---|---|---|
| 3,116,046 A | * | 12/1963 | Risdon | 297/188.2 X |
| 3,707,272 A | * | 12/1972 | Rasmussen | 248/311.2 X |
| 3,814,367 A | * | 6/1974 | Rasmussen | 248/311.2 |
| 4,262,962 A | * | 4/1981 | Yust | 297/188.18 |
| 4,865,237 A | * | 9/1989 | Allen | 248/311.2 X |
| 4,896,858 A | * | 1/1990 | Sokolski et al. | 248/311.2 |
| 4,961,555 A | * | 10/1990 | Egan, Jr. | 248/311.2 X |
| 5,010,826 A | * | 4/1991 | Kudlac | 297/188.2 X |
| 5,106,046 A | * | 4/1992 | Rowles et al. | 248/311.2 |
| 5,106,156 A | | 4/1992 | Marquis | |
| 5,118,063 A | * | 6/1992 | Young, Jr. | 297/188.18 X |
| 5,238,212 A | * | 8/1993 | Dechellis | 297/188.18 X |
| 5,279,452 A | * | 1/1994 | Huynh | 248/311.2 X |
| 5,282,598 A | * | 2/1994 | Greene | 297/188.14 X |
| 5,332,286 A | | 7/1994 | Atherton et al. | |
| 5,356,107 A | * | 10/1994 | Sinohuiz | 297/188.18 X |
| 5,361,950 A | * | 11/1994 | Signal et al. | 248/311.2 X |
| 5,395,081 A | * | 3/1995 | Vollink | 248/311.2 X |
| 5,533,786 A | | 7/1996 | Cone, II | |
| 5,586,800 A | * | 12/1996 | Triplett | 297/188.18 X |
| 5,615,925 A | | 4/1997 | Kain | 297/188.2 X |
| 5,662,378 A | * | 9/1997 | Carruth | 297/188.18 X |
| 5,695,162 A | * | 12/1997 | DiCastro | 297/188.2 X |
| 5,720,516 A | * | 2/1998 | Young | 297/188.14 X |
| D392,513 S | | 3/1998 | Reber | |
| 5,782,448 A | * | 7/1998 | Withun et al. | 248/311.2 |
| 5,810,432 A | | 9/1998 | Haut et al. | |
| 5,865,412 A | * | 2/1999 | Mason | 248/311.2 |
| 5,893,605 A | * | 4/1999 | Chang | 297/188.14 |
| 5,964,501 A | * | 10/1999 | Magnani | 297/188.18 X |
| 6,059,357 A | * | 5/2000 | Peart | 297/188.14 X |
| 6,062,640 A | * | 5/2000 | Stahl | 297/188.18 X |
| 6,079,599 A | * | 6/2000 | Nordstrom et al. | 297/188.12 X |
| 6,227,510 B1 | * | 5/2001 | Mcmullen, Sr. | 248/311.2 |
| 6,227,511 B1 | * | 5/2001 | De Costa | 297/188.18 X |
| 6,260,811 B1 | * | 7/2001 | O'Neil | 248/311.2 |
| 6,283,042 B1 | * | 9/2001 | Wargo et al. | 297/188.2 X |
| 6,290,063 B1 | * | 9/2001 | Vogt et al. | 248/311.2 X |
| 6,299,116 B1 | * | 10/2001 | Levesque | 248/311.2 X |
| 6,343,837 B1 | * | 2/2002 | Gage | 297/250.1 |

* cited by examiner

*Primary Examiner*—Rodney B. White
(74) *Attorney, Agent, or Firm*—Allen, Dyer, Doppelt, Milbrath & Gilchrist, P.A.

(57) ABSTRACT

A cup holder for a child's car seat having at least one seat belt receiving slot comprises a holder body having an upper surface, a lower surface, and an opening extending through the holder body from the upper surface to the lower surface, and a connecting member extending from said holder body for inserting in the seat belt receiving slot to thereby connect the holder body to the child's car seat. The connecting member extends from the holder body at an angle sufficient so that the upper surface of said holder body is positioned approximately parallel to a seating surface of the car seat when the connecting member is properly inserted in the seat belt receiving slot. The opening is dimensioned to hold a container therein without the container falling through the opening.

18 Claims, 5 Drawing Sheets

CUP HOLDER FOR CHILD'S CAR SEAT AND ASSOCIATED METHOD

FIELD OF THE INVENTION

The present invention relates to the field of children's car seats and, more particularly, to a cup holder easily connected thereto.

BACKGROUND OF THE INVENTION

Car seats for children have been popular for many years, since the standard vehicle seats provided by car manufacturers are not well adapted to small children. In many states, children's car seats have become mandatory under the law for children of about 5 years of age and younger.

Parents who travel with their children by any one of various types of road vehicles, are usually very familiar with children's car seats. These car seats generally include seat belt receiving slots to thereby secure the child's car seat to the vehicle's standard seat by means of the seat belt. As any parent well knows who travels in a vehicle with children, keeping the child entertained and calm while restrained in a car seat is often a challenging, if not insurmountable task. It is often helpful to give the child a beverage to drink while on a trip, however, children's car seats presently available generally do not provide a holder for the child to place a cup or other beverage container.

SUMMARY OF THE INVENTION

With the foregoing in mind, the present invention advantageously provides a cup holder for a child's car seat having at least one seat belt receiving slot. The cup holder comprises a holder body having an upper surface, a lower surface, and an opening extending through the holder body from the upper surface to the lower surface, and a connecting member extending from said holder body for inserting in the seat belt receiving slot to thereby connect the holder body to the child's car seat. The connecting member extends from the holder body at an angle predetermined so that the upper surface of said holder body is positioned approximately parallel to a seating surface of the car seat when the connecting member is properly inserted in a seat belt receiving slot.

BRIEF DESCRIPTION OF THE DRAWINGS

Some of the features, advantages, and benefits of the present invention having been stated, others will become apparent as the description proceeds when taken in conjunction with the accompanying drawings in which.

DETAILED DESCRIPTION OF THE PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art.

Figure 1:
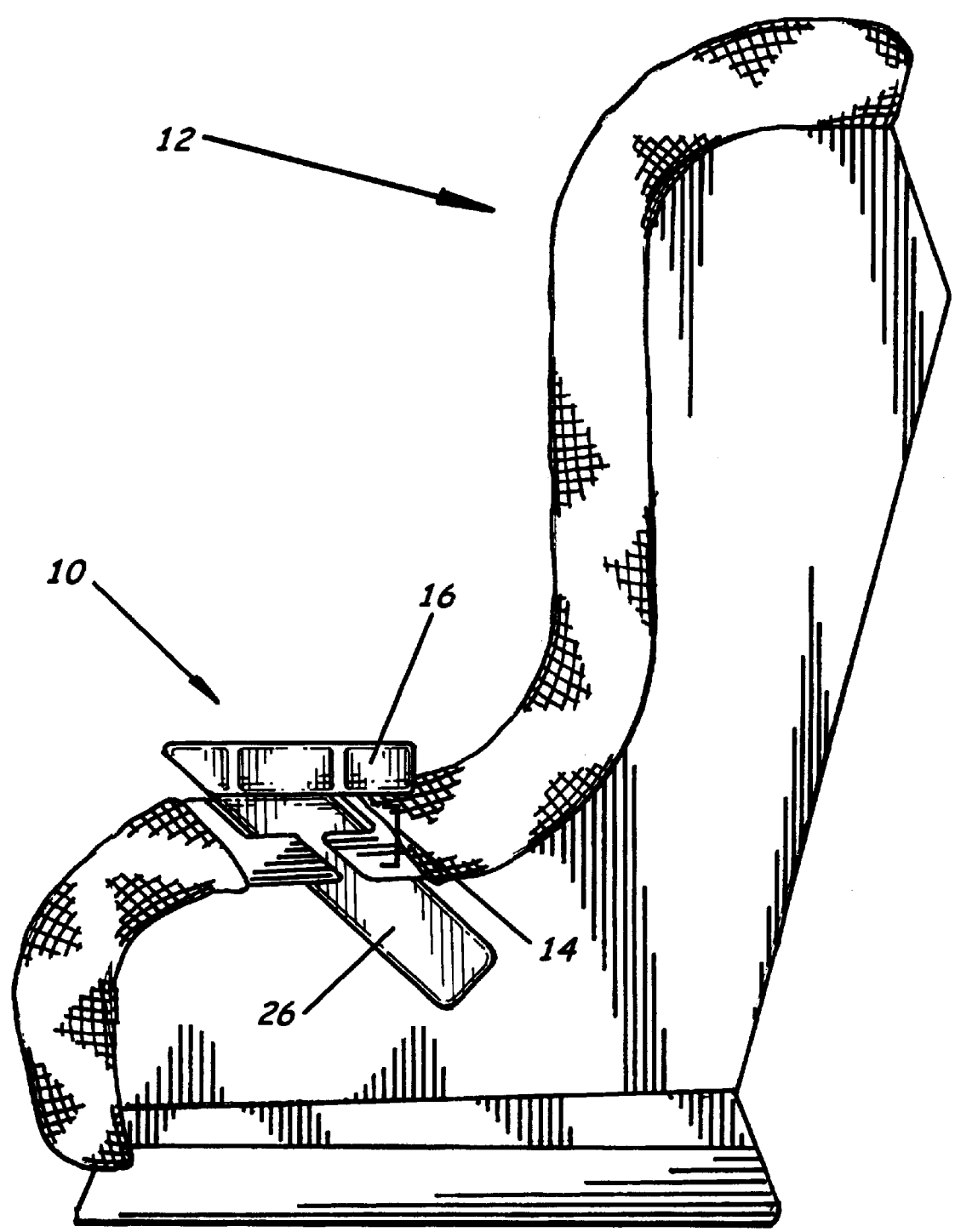
FIG. 1 is a side elevation of the cup holder connected to a child's car seat according to an embodiment of the present invention.
Figure 2:
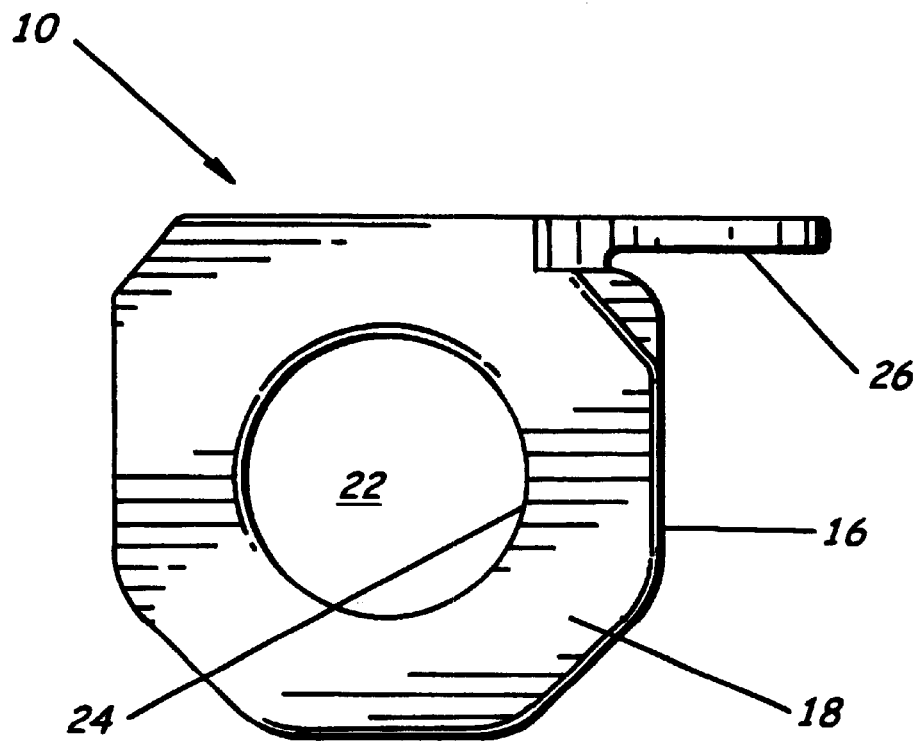
FIG. 2 is a top plan view of the cup holder of FIG. 1.
Figure 3:
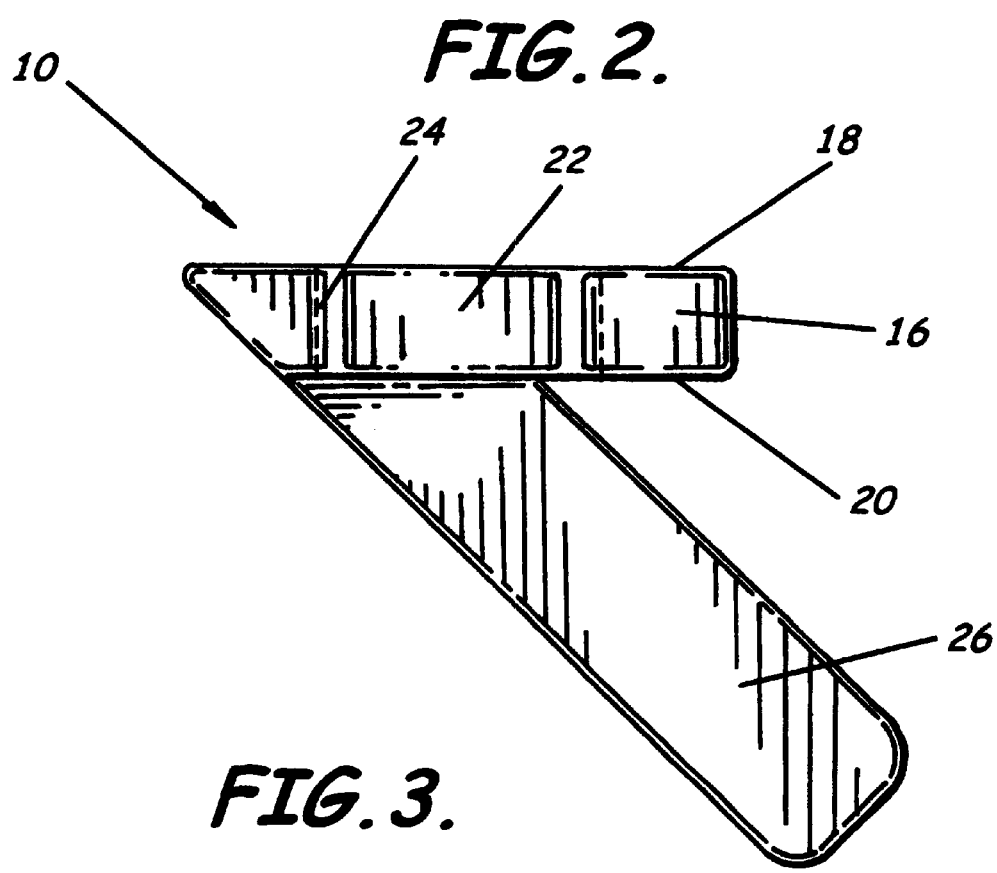
FIG. 3 is a side elevation view of the cup holder of FIG. 2.
Figure 4:
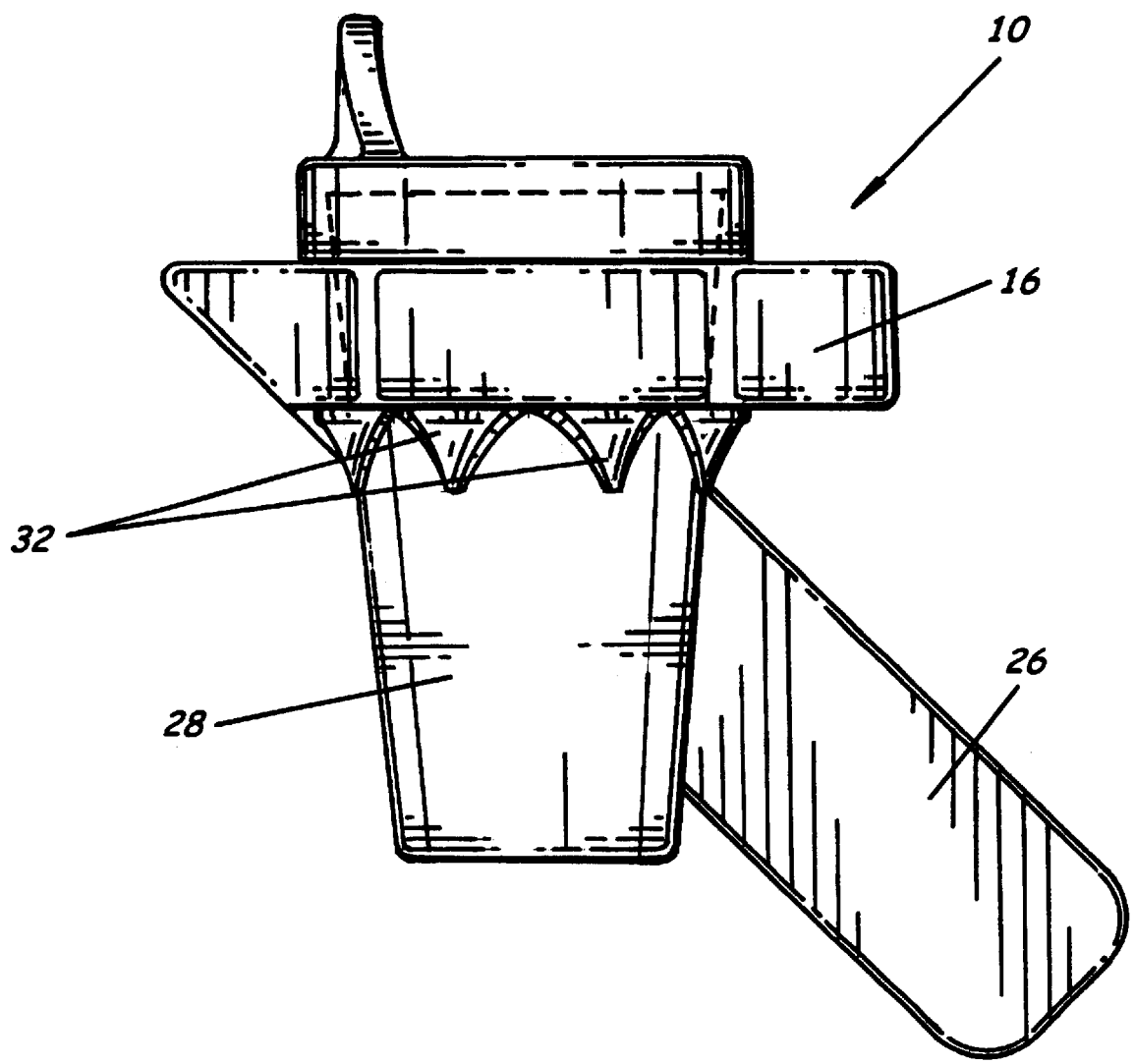
FIG. 4 is a side elevation view of the cup holder of FIG. 1 hold a child's drinking cup, and having gripping material around a periphery of the opening.
Figure 5:
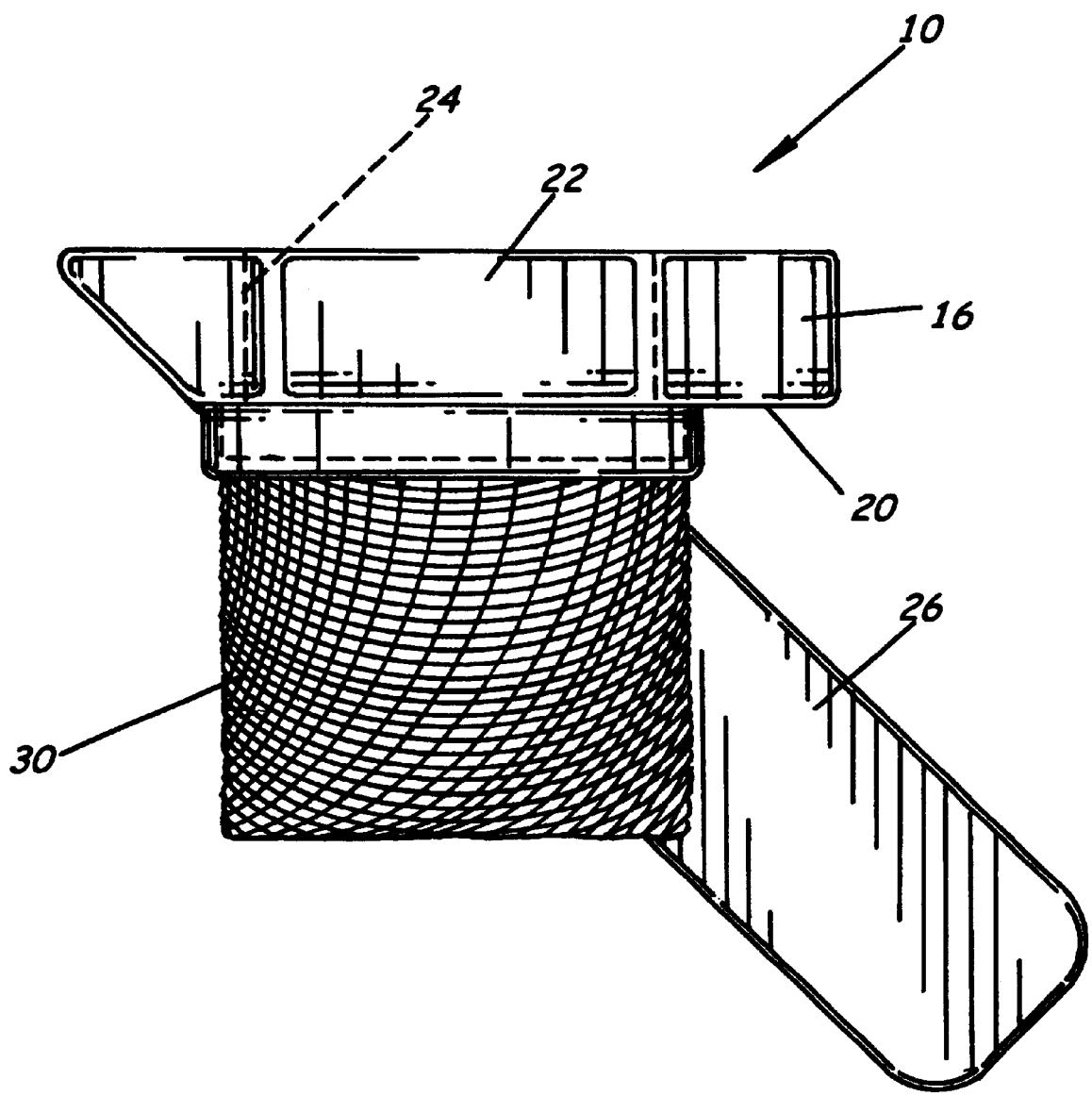
FIG. 5 shows a side elevation view of the cup holder of FIG. 1 disposed with a mesh bag for holding small articles, such as toys and supplies.
Figure 6:
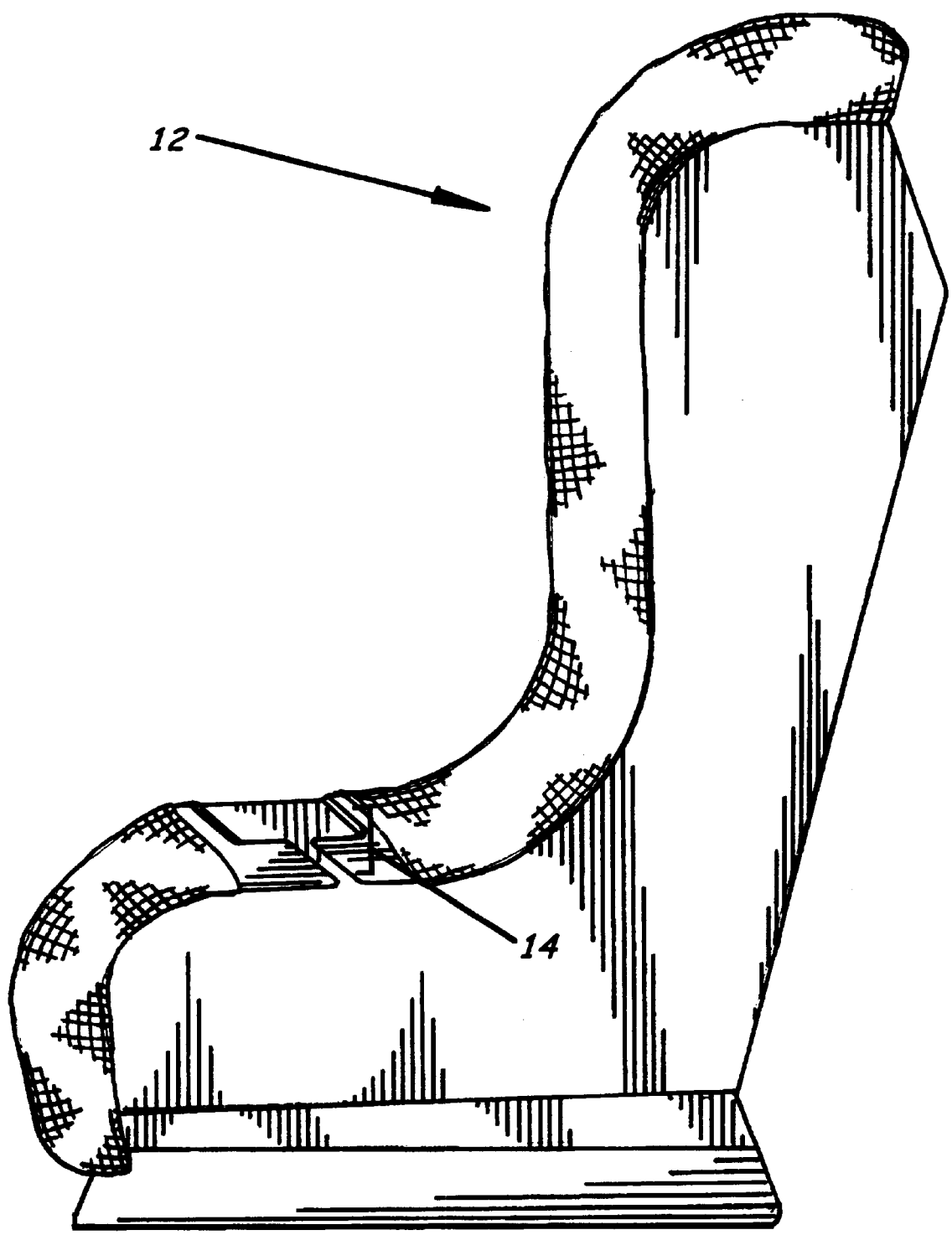
FIG. 6 shows a side elevation of a standard type of child's car seat, as known in the art.

FIGS. 1 through 5 illustrate a cup holder 10 for a child's car seat 12 having at least one seat belt receiving slot 14, as best shown in FIG. 6. Car seats for children 12 are generally provided with at least two seat belt receiving slots 14. Most car seats have these seat belt receiving slots positioned along raised sides of the car seat, as shown in FIG. 6. When used for a very young child, an infant, the car seat 12 is normally placed so that the child faces the backrest of the vehicle's seat, that is, the child faces rearwardly in the vehicle. In this first position, the vehicle's seat belt is passed through the car seat's seat belt receiving slots 14 in order to secure the child's car seat to the vehicle's seat. For older children, however, the car seat 12 is positioned on the vehicle's seat so that the child faces toward the front of the vehicle, that is, the backrest of the child's car seat rests on the backrest of the vehicle's seat. In this second position, the seat belt receiving slots 14 are not used for a seat belt, and the car seat is secured on the vehicle's seat using an alternative arrangement. The cup holder 10 of the present invention is preferably intended for use by children who are old enough to handle a drinking cup, a child beyond the infant stage. Therefore, a preferred embodiment of the cup holder 10 is designed to be connected to a seat belt receiving slot 14 which is not in use with a seat belt. In another embodiment, however, the cup holder may be connected to the seat belt receiving slot which also has a seat belt connected therein. In this embodiment, the cup holder of the invention provides a place where the infant's caretaker may conveniently rest a baby bottle, for example.

The cup holder 10 comprises a holder body 16 having an upper surface 18, a lower surface 20, and an opening 24 extending through the holder body from the upper surface to the lower surface, and a connecting member 26 extending from the holder body for inserting in the seat belt receiving slot to thereby connect the holder body to the child's car seat. The connecting member 26 preferably extends from the holder body 16 at an angle predetermined so that the upper surface 18 of the holder body is positioned approximately parallel to a seating surface of the car seat when the connecting member is properly inserted in the seat belt receiving slot 14. In an alternative embodiment, not shown in the figures, the cup holder 10 includes a connecting member comprising a spring clip for to thereby connect the holder body 16 to the child's car seat. The spring clip connects to the car seat by hanging the cup holder on a side arm of the car seat. The spring clip may be provided with a fastener for fastening the spring clip to the child's car seat.

As best shown in FIG. 4, the cup holder 10 has an opening in the holder body 16 dimensioned to hold a container partially therein without the container falling through the opening. The holder body 16 optionally comprises an ornamental design, which may include the likeness of a cartoon character, or a character from children's stories. For example, a number of well-known, proprietary characters suitable for illustrating the cup holder include Mickey Mouse®, and other characters owned by the Walt Disney Co. There are many other well-known characters available from children's stories and suitable for use with the present invention, for example, the currently popular Harry Potter®. Additionally, in one embodiment the cup holder 10 comprises a phosphorescent material which glows in the dark, to thereby make the cup holder more easily visible at night. In another embodiment, the cup holder 10 includes a holder body 16 detachably connected to the connecting member. Preferably, the holder body 16 is detachably connected to the connecting member 26 by a hook and loop fastener, and may be configured so that the holder body detaches from the connecting member upon application of a sufficient force.

In yet another preferred embodiment, the cup holder 10 comprises a container 28 positioned in the opening 22, the container dimensioned so as to engage a periphery 24 of the opening and not fall therethrough. Advantageously, the cup holder 10 may comprise a bag 30 having an interior cavity, the bag connected to the holder body 16 so that the opening 22 connects with the interior cavity of the bag. The bag 30 may be a mesh bag, as illustrated in FIG. 5, which is particularly useful for holding toys and other small items. For holding a cup, the holder body 16 may include around a periphery 24 of the opening 22 a material 32 providing friction against a cup or container positioned in the opening to thereby aid in retaining the container therein, as shown in FIG. 4. The material providing friction preferably comprises a ring of synthetic material, and may preferably be rubber or plastic.

Another aspect of the invention includes a method of holding a cup adjacent a child's car seat having at least one seat belt receiving slot. The includes connecting a cup holder 10 to the at least one seat belt receiving slot, and positioning a cup in the cup holder so as to hold the cup adjacent the child's car seat. In the method the cup holder 10 comprises a holder body 16 having an upper surface, a lower surface, a periphery, and an opening extending through the holder body from the upper surface to the lower surface for therein holding a cup, and a connecting member extending from the holder body and inserted into the seat belt receiving slot thereby connecting the holder body to the child's car seat.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims.

What is claimed is:

1. In combination, a child's car seat and a cup holder, the combination comprising:
   a child's car seat having at least one seat belt receiving slot for securing the car seat to a vehicle's seat with a seat belt; and
   a cup holder comprising a holder body having an upper surface, a lower surface, and an opening extending through the holder body from the upper surface to the lower surface, and a connecting member extending from said holder body and inserted in the seat belt receiving slot thereby connecting the holder body to the child's car seat.

2. The combination of claim 1, wherein the connecting member extends from said holder body at an angle sufficient so that the upper surface of said holder body is positioned approximately parallel to a seating surface of the car seat when the connecting member is properly inserted in the seat belt receiving slot.

3. The combination of claim 1, wherein the opening is dimensioned to hold a container partially therein without the container falling through the opening.

4. The combination of claim 1, wherein the cup holder comprises a container holder.

5. The combination of claim 1, wherein the cup holder comprises an ornamental design.

6. The combination of claim 1, wherein the cup holder comprises the likeness of a cartoon character.

7. The combination of claim 1, wherein the cup holder comprises the likeness of a character from children's literature.

8. The combination of claim 1, wherein the cup holder further comprises a phosphorescent material which glows in the dark.

9. The combination of claim 1, wherein said holder body is detachably connected to said connecting member.

10. The combination of claim 1, wherein said holder body is detachably connected to said connecting member by a hook and loop fastener.

11. The combination of claim 1, wherein said holder body detaches from said connecting member upon application of a sufficient force.

12. The combination of claim 1, further comprising a container positioned in the opening and dimensioned so as to engage a periphery of the opening and not fall therethrough.

13. The combination of claim 1, further comprising a bag having an interior cavity, the bag connected to the holder body so that the opening connects with the interior cavity.

14. The combination of claim 13, wherein the bag comprises a mesh.

15. The combination of claim 1, wherein said holder body comprises around a periphery of the opening a material providing friction against a container positioned in the opening to thereby aid in retaining the container therein.

16. The combination of claim 15, wherein the material providing friction comprises a ring of synthetic material.

17. A method of holding a cup adjacent a child's car seat having at least one seat belt receiving slot, the method comprising:
   connecting a cup holder to the at least one seat belt receiving slot by a connecting member extending from the cup holder adapted to be received by the at least one seat belt receiving slot; and
   positioning a cup in the cup holder so as thereby hold the cup adjacent the child's car seat.

18. A method of providing a holder adjacent a child's car seat having at least one seat belt receiving slot, the method comprising connecting the holder to the at least one seat belt receiving slot by a connecting member extending from the cup holder adapted to be received by the at least one seat belt receiving slot.

* * * * *